(12) United States Patent
Sen et al.

(10) Patent No.: US 11,430,451 B2
(45) Date of Patent: Aug. 30, 2022

(54) LAYERED CODING OF AUDIO WITH DISCRETE OBJECTS

(71) Applicant: Apple Inc., Cupertino, CA (US)

(72) Inventors: Dipanjan Sen, Dublin, CA (US); Frank Baumgarte, Sunnyvale, CA (US); Juha O. Merimaa, San Mateo, CA (US)

(73) Assignee: APPLE INC., Cupertino, CA (US)

( * ) Notice: Subject to any disclaimer, the term of this patent is extended or adjusted under 35 U.S.C. 154(b) by 63 days.

(21) Appl. No.: 16/584,706

(22) Filed: Sep. 26, 2019

(65) Prior Publication Data

US 2021/0098004 A1    Apr. 1, 2021

(51) Int. Cl.
*G10L 19/008*  (2013.01)
*H04S 7/00*  (2006.01)
(Continued)

(52) U.S. Cl.
CPC ............ *G10L 19/008* (2013.01); *H04S 3/008* (2013.01); *H04S 7/30* (2013.01); *G11B 27/22* (2013.01);
(Continued)

(58) Field of Classification Search
CPC ......... G10L 19/008; H04S 3/008; H04S 7/30; H04S 2400/01; H04S 240/11; H04S 2420/11; G11B 27/22; H04N 21/23439; H04N 21/2368; H04N 21/4394; H04N 21/6587; H04N 21/8106
See application file for complete search history.

(56) References Cited

U.S. PATENT DOCUMENTS

2005/0049486 A1* 3/2005 Urquhart ................ A61B 34/20
600/429
2011/0040396 A1* 2/2011 Kraemer ................. G10L 19/00
700/94
(Continued)

FOREIGN PATENT DOCUMENTS

WO    2019012133    1/2019

OTHER PUBLICATIONS

Baumgarte, Frank, et al., "Binaural Cue Coding—Part 1: Psychoacoustic Fundamentals and Design Principles", IEEE Transactions on Speech and Audio Processing, vol. 11, No. 6, Nov. 2003, pp. 509-519.
(Continued)

*Primary Examiner* — Duc Nguyen
*Assistant Examiner* — Kuassi A Ganmavo
(74) *Attorney, Agent, or Firm* — Womble Bond Dickinson (US) LLP (57) ABSTRACT

A first layer of data having a first set of Ambisonic audio components can be decoded where the first set of Ambisonic audio components is generated based on ambience and one or more object-based audio signals. A second layer of data is decoded having at least one of the one or more object-based audio signals. One of the object-based audio signals is subtracted from the first set of Ambisonic audio components. The resulting Ambisonic audio components are rendered to generate a first set of audio channels. The one or more object-based audio signals are spatially rendered to generate a second set of audio channels. Other aspects are described and claimed.

19 Claims, 5 Drawing Sheets

(51) Int. Cl.
    *H04S 3/00*     (2006.01)
    *H04N 21/2343*     (2011.01)
    *H04N 21/2368*     (2011.01)
    *G11B 27/22*     (2006.01)
    *H04N 21/439*     (2011.01)
    *H04N 21/81*     (2011.01)
    *H04N 21/6587*     (2011.01)

(52) U.S. Cl.
    CPC ... *H04N 21/2368* (2013.01); *H04N 21/23439* (2013.01); *H04N 21/4394* (2013.01); *H04N 21/6587* (2013.01); *H04N 21/8106* (2013.01); *H04S 2400/01* (2013.01); *H04S 2400/11* (2013.01); *H04S 2420/11* (2013.01)

(56) References Cited

U.S. PATENT DOCUMENTS

| | | | | |
|---|---|---|---|---|
| 2014/0303762 | A1* | 10/2014 | Johnson | G10L 19/24 700/94 |
| 2014/0350944 | A1* | 11/2014 | Jot | G10L 19/008 704/500 |
| 2016/0104493 | A1* | 4/2016 | Kim | H04S 3/008 381/22 |
| 2017/0011750 | A1* | 1/2017 | Liu | G10L 19/008 |
| 2017/0180902 | A1 | 6/2017 | Kordon et al. | |
| 2018/0213202 | A1* | 7/2018 | Kopeinigg | H04N 13/161 |
| 2019/0385622 | A1* | 12/2019 | Kim | G10L 19/008 |
| 2020/0105282 | A1* | 4/2020 | Kim | G10L 19/0208 |
| 2020/0162833 | A1* | 5/2020 | Lee | H04R 5/04 |
| 2020/0245092 | A1* | 7/2020 | Badhwar | H04S 7/30 |

OTHER PUBLICATIONS

Baumgarte, Frank, "Layered FOA coding, Parametric FOA coding", Aug. 9, 2019, 5 pages.

Faller, Christof, et al., "Binaural Cue Coding—Part II: Schemes and Applications", IEEE Transactions on Speech and Audio Processing, vol. 11, No. 6, Nov. 2003, pp. 520-531.

Glasberg, Brian R., et al., "Derivation of auditory filter shapes from notched-noise data", Hearing Research, vol. 47, Feb. 27, 1990, pp. 103-119.

"Information technology—High efficiency coding and media delivery in heterogeneous environments—Part 3: 3D audio", International Standard ISO/IEC 23008-3, Feb. 2019, 812 pages.

Herre, Jurgen, et al., "MPEG Surround—The ISO/MPEG Standard for Efficient and Compatible Multichannel Audie Coding", J. Audio Eng. Soc., vol. 56, No. 11, Nov. 2008, pp. 932-955.

Herre, Jurgen, et al., "MPEG-H Audio—The New Standard for Universal Spatial/3D Audio Coding", J. Audio Eng. Soc., vol. 62, No. 12, Dec. 2014, pp. 821-830.

Bleidt, Robert L., et al., "Development of the MPEG-H TV Audio System for ATSC 3.0", IEEE Transactions on Broadcasting, vol. 63, No. 1, Mar. 2017, pp. 202-236.

"Information technology—MPEG audio technologies—Part 1: MPEG Surround", International Standard ISO/IEC 23003-1, Feb. 15, 2007, 288 pages.

"Information technology—High efficiency coding and media delivery in heterogeneous environments—Part 3: 3D Audio AMENDMENT 1: Audio metadata enhancements", International Standard ISO/IEC 23008-3, Jun. 2016, 42 pages.

\* cited by examiner

LAYERED CODING OF AUDIO WITH DISCRETE OBJECTS

FIELD

One aspect of the disclosure relates to layered coding of audio with discrete objects.

BACKGROUND

Audio signals can have different formatting. Traditional channel-based audio is recorded with a listening device in mind, for example, 5.1 home theater with five speakers and one subwoofer. Object-based audio encodes audio sources as objects with meta-data that describes spatial information about the object.

SUMMARY

Trading off spatial resolution with layered coding of audio has challenges. Traditional audio is channel-based, for example, 5.1 or 4.1. Channel-based audio does not lend itself to being layered because if the channels are treated as layers, then the absence of a layer would be noticeable and distracting because an entire speaker could be turned off or mute if a corresponding layer is not processed. Similarly, when multiple objects (e.g., sound sources) constitute a sound field, if the objects are treated as layers, without any additional measures, then absence of one or more of the objects could result in a misrepresentation of the sound field.

Ambisonics has an inherently hierarchical format. Each increasing order (e.g., first order, second order, third order, and so on) adds spatial resolution when played back to a listener. Ambisonics can be formatted with just the lower order Ambisonics, such as with first order, W, X, Y, and Z. This format, although having a relatively low bandwidth footprint, provides low spatial resolution. Much higher order Ambisonic components are typically required for high resolution immersive spatial audio experience.

Objects can be converted to Ambisonics and the natural hierarchy of Ambisonics can then allow greater spatial resolution and detail of the objects as the order of the Ambisonics signal is increased. Regardless of how many components are included, this approach alone lacks flexibility in rendering different sound sources (objects) because those sound sources are hard-coded in the Ambisonic audio signals. Being able to access objects individually allows for a playback device to provide high resolution rendering of these objects as well as being able to manipulate each object independently, for example, an object can be virtually moved around a sound field, added and removed at will, and/or have its level adjusted independently of other sounds in the audio experience.

Different playback devices may also have different playback capabilities. For example, a playback device can have the ability to render near-field audio to a user. It may be advantageous for such a playback device to receive a bit stream with an object-based signal to render in the near field. A second playback device, however, might not be able to render near-field audio. In this case, if the object-based signal is transmitted from one device to another, this signal can go unutilized, which can result in a waste of bandwidth.

A hybrid audio processing technique that layers Ambisonic audio components and object-based audio is lacking. Such a hybrid technique is beneficial as objects allow for near-field effects, precise localization, as well as interactivity. The object can be virtually moved around as seen fit, and/or have its level changed, and/or be added or removed from an audio scene as seen fit. Ambisonics can further provide a compelling spatial ambience reproduction.

In one aspect of the present disclosure, a hybrid audio processing technique is described. The process includes generating a base layer having a first set of Ambisonic audio components (e.g., first order only, or first order and second order only) based on ambience and one or more object-based audio signals. In this first set, the object-based audio signals can be converted into Ambisonic components and then combined with ambience that is also in Ambisonic format. This base layer can fully represent a desired audio scene in that it has sounds captured in ambience as well as sounds from individual sound sources that are converted into Ambisonic components. The first set of Ambisonic audio components, along with an optional number of objects (and associated metadata) that have not been converted to Ambisonics, can be included in a base (or first) layer that is encoded into a bit stream.

At least one of the object-based audio signals can be included in a second layer (or an 'enhancement layer'). It should be understood that object-based audio signals include associated metadata, for example, direction, depth, width, diffusion. Additional enhancement layers can also be added having additional object-based audio and/or additional Ambisonic audio components. The additional Ambisonic components could be higher order coefficients or coefficients of the same order but not included in lower levels (for example the first order Z coefficient if the previous levels only included the first order X and Y and the zeroth order W).

Metadata can be included in the bit stream that provides a playback device and/or decoding device with configuration details of each and every layer. The receiving device can make an informed selection as to which layers, other than the base layer, shall be received. Such a selection can be determined based on bandwidth, which can vary over time, and/or the receiving device's capabilities. For example, the receiving device may not want to receive a layer or a stack of layers that contains near-field object based audio, if it cannot render and playback the object. The device may select a different layer or stack of layers that has the same sound source represented by the object-based audio, but embedded into the Ambisonics components.

The device can select which layer to receive based on either the direction that the user of the device is pointing towards or facing (in the 3D space) or one or more directions that the user of the device is interested in (by some user based interactivity that indicates the direction of interest). Image sensing with a camera and computer vision and/or an inertial measurement unit can be used to determine a direction that the user is pointed towards or facing. Other techniques can also be employed to determine user position. Objects that are located in these directions can be picked by receiving the layers that contain these objects. For example, if audio content at the encoder contains birds chirping at a location associated with a right hand side of a user, and a user turns to face her right hand side, the decoder can request to receive an enhancement layer that is associated with the direction that the user has turned to face. The encoder can then include in a bit stream which is transmitted to the user that includes sounds in the location corresponding to the user's right hand side, such as the chirping birds. Similarly, the user can indicate, in settings or a user interface, that the user would like to hear sounds at a location corresponding to the user's right hand side, or from above or below. The decoder can then send request to receive enhancement layers associated with such locations.

In such a manner, a hybrid audio processing technique provides layered coding using Ambisonics and object-based audio. The base layer includes lower order Ambisonics (e.g., first order or first and second order) having sounds from all object-based signals that might be relevant to the audio scene, as well as ambience. Additional layers have additional Ambisonics components (e.g., of increasing order) and/or additional object-based audio signals. When an audio object is transmitted as part of any of the non-base layers, the object's contribution can be subtracted from the Ambisonics representation of the previous layers, allowing the object to be rendered independently of the Ambisonics renderer. This is possible as the decoder will have knowledge of how each object was added to the Ambisonics mix at the encoder, through for example, configuration information present in metadata. This can prevent double rendering of the object, as described further in other sections.

Further, different devices can traverse layers differently. For example, if a legacy device does not have the computational power to render an object independently (using near field techniques, for example), the device can choose not to select a layer that contains such an object. Instead, the device can traverse a different stack layer that allows less computationally complex rendering, at the cost of quality of service and spatial resolution.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Ambisonics relates to a technique for recording, mixing, and playing back three-dimensional 360-degree audio both in the horizontal and/or vertical plane. Ambisonics treats an audio scene as a 360-degree sphere of sound coming from different directions around a center. An example of an Ambisonics format is B-format, which can include first order Ambisonics consisting of four audio components—W, X, Y and Z. Each component can represent a different spherical harmonic component, or a different microphone polar pattern, pointing in a specific direction, each polar pattern being conjoined at a center point of the sphere.

Ambisonic audio can be extended to higher orders, increasing the quality of localization. With increasing order, additional Ambisonic components will be introduced, for example, 5 new components for second order, 7 new components for third order, and so on. This can cause the footprint or size of the audio information to grow, which can quickly run up against bandwidth limitations.

Layered coding provides a means to transmit hierarchical layers. A receiver selects which layers it would like to decode based on available bandwidth and/or device level capabilities. A layered approach is different from canonical approaches where there are multiple independent manifests of the same content at different bitrates. Layers typically build on each other, with each additional layer providing an improved quality of audio experience to a consumer. Spatial resolution is typically traded off with the number of layers that is decoded, consuming less layers can result in lower spatial resolution, but can also help different devices adapt to different bandwidth constraints.

Figure 1:
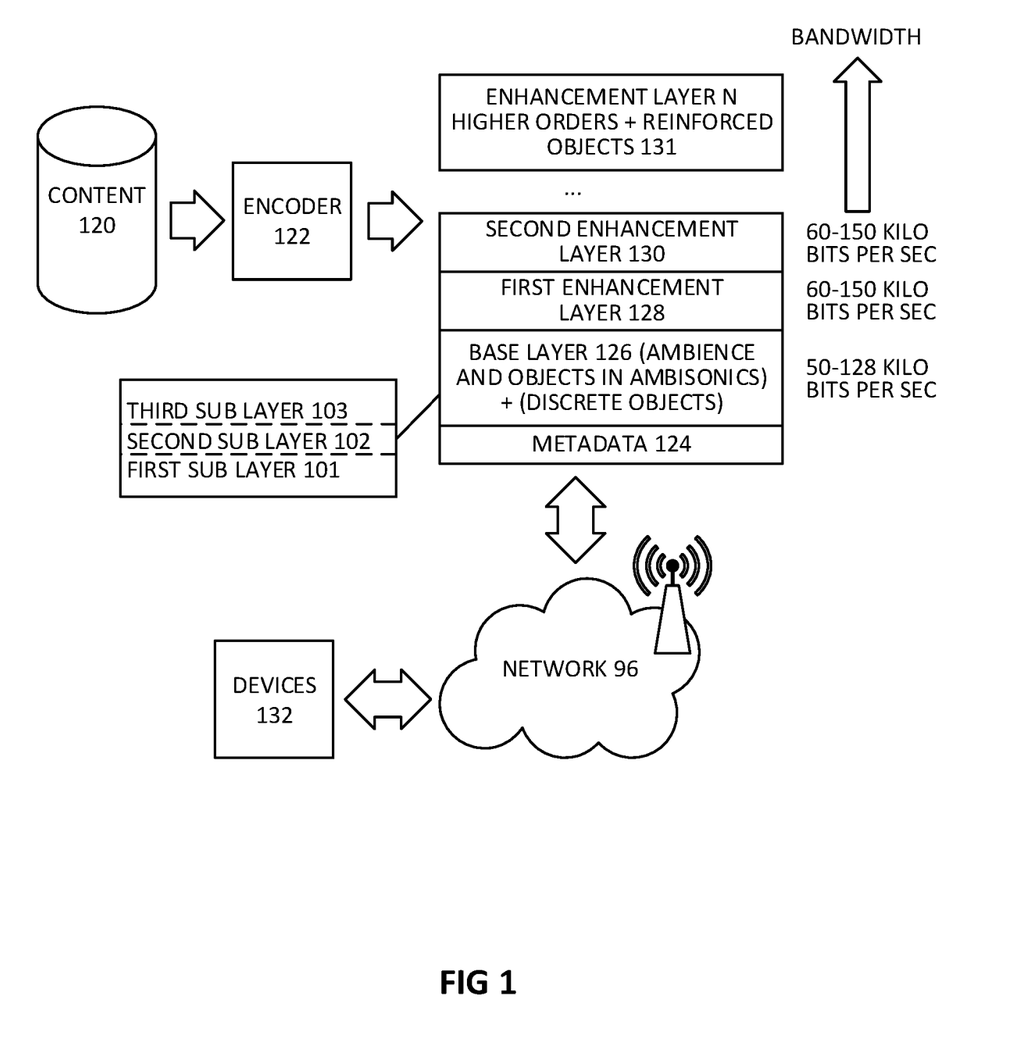
FIG. 1 shows a process and system for encoding layered audio with Ambisonics and object-based audio, according to one aspect.

Referring now to FIG. 1, audio content 120 can be encoded by an encoder 122 into a hybrid and layered audio asset that can be transmitted in a bit stream over a network 96 to downstream devices 132. The encoder can generate a first set of Ambisonic audio components based on ambience and one or more object-based audio signals and include the first set into base layer 126. Thus, the base layer can have both ambience and sounds from object-based audio signals contained in the first set of Ambisonic components as well as some objects that are not mixed into the Ambisonics signal. The first set of Ambisonic audio components can include only low order Ambisonic components, for example, only zeroth order, zeroth order and first order, or only zeroth, first and second order.

The encoder can encode at least one of the object-based audio signals into a first enhancement layer 128. First enhancement layer 128 can include Ambisonic audio components of the same or higher order as those in the base layer. Second enhancement layer 130 and additional enhancement layers, e.g., layer 131, can provide additional object-based audio signals and/or additional Ambisonic audio components. Metadata 124 can include configuration information (e.g., which layers are available, and Ambisonic components and/or object-based audio in each available layer) that allows devices 132 to determine which layers should be transmitted over network 96. Such a determination can be made by the encoder or by the receiving device based on bandwidth and/or device capabilities as well as listener position/preference, as mentioned.

For example, content 120 can include an audio scene with M Ambisonic orders, resulting in $N=(M+1)^2$ number of Ambisonic audio components. The Ambisonic audio components here can represent ambience, which should be understood as any sound in a scene other than the discrete objects, for example, ocean, vehicle traffic, wind, voices, music, etc. In addition, content 120 might contain numerous object-based audio signals that each represent a discrete sound source, such as a speaker's voice, a bird chirping, a door slamming, a pot whistling, a car honking, etc.

In such a case, the encoder can combine all the discrete sound sources with the ambience Ambisonic audio components, and include only a lower order first set of those Ambisonic audio components into the base layer 126. This set can include only an omnidirectional pattern (W) audio component, a first bi-directional polar pattern audio component aligned in a first (e.g., front-to-back) direction X, a second bi-directional polar pattern audio component aligned in a second (e.g., left-to-right) direction Y, and a third bi-directional polar pattern audio component aligned in a third (e.g., up-down) direction Z. Some discrete sound sources (objects) may be included outside of this process— i.e sent discretely alongside the aforementioned Ambisonics signal but without being mixed into the Ambisonics signal. For example, as shown in FIG. 1, base layer 126 can contain Ambisonics components with objects mixed in, as well as audio signals of objects that are not mixed with the Ambisonics components (e.g., discrete).

In first enhancement layer 128, the encoder can include an object-based audio signal of at least one of the object-based audio assets (and associated metadata such as direction, depth, width, diffusion, and/or location) and/or additional Ambisonic audio components (for example, one or more second order Ambisonic audio components). Each successive layer that builds on the base layer can have additional Ambisonic audio components thereby increasing spatial resolution and providing additional discrete audio objects that can be rendered spatially by a downstream device. The object-based audio signals in the enhancement layers are not mixed into the Ambisonics signals of the enhancement layers.

With such a layered encoding of audio, if a downstream device senses that network bandwidth is small (e.g., 50-128 kbps), then the downstream device can communicate to the encoder to only transmit the base layer. If, moments later, the network bandwidth increases, for example, if the downstream device moves to a location with increased bandwidth (e.g., a stronger wireless connection, or from a wireless connection to a wired connection), then the downstream device can request that the encoder transmit enhancement layers 128-131. The downstream device can examine metadata 124 that includes configuration data indicating a) one or more selectable layers (e.g., enhancement layers 128-131) that can be encoded and transmitted in the bit stream, and b) Ambisonic audio components or audio objects in each of the selectable layers. As is known, Ambisonic audio components can be indicated by their respective Ambisonics coefficients, which indicates a particular polar pattern (e.g., omni-directional, figure-of-eight, cardioid, etc.) and direction.

Figure 4:
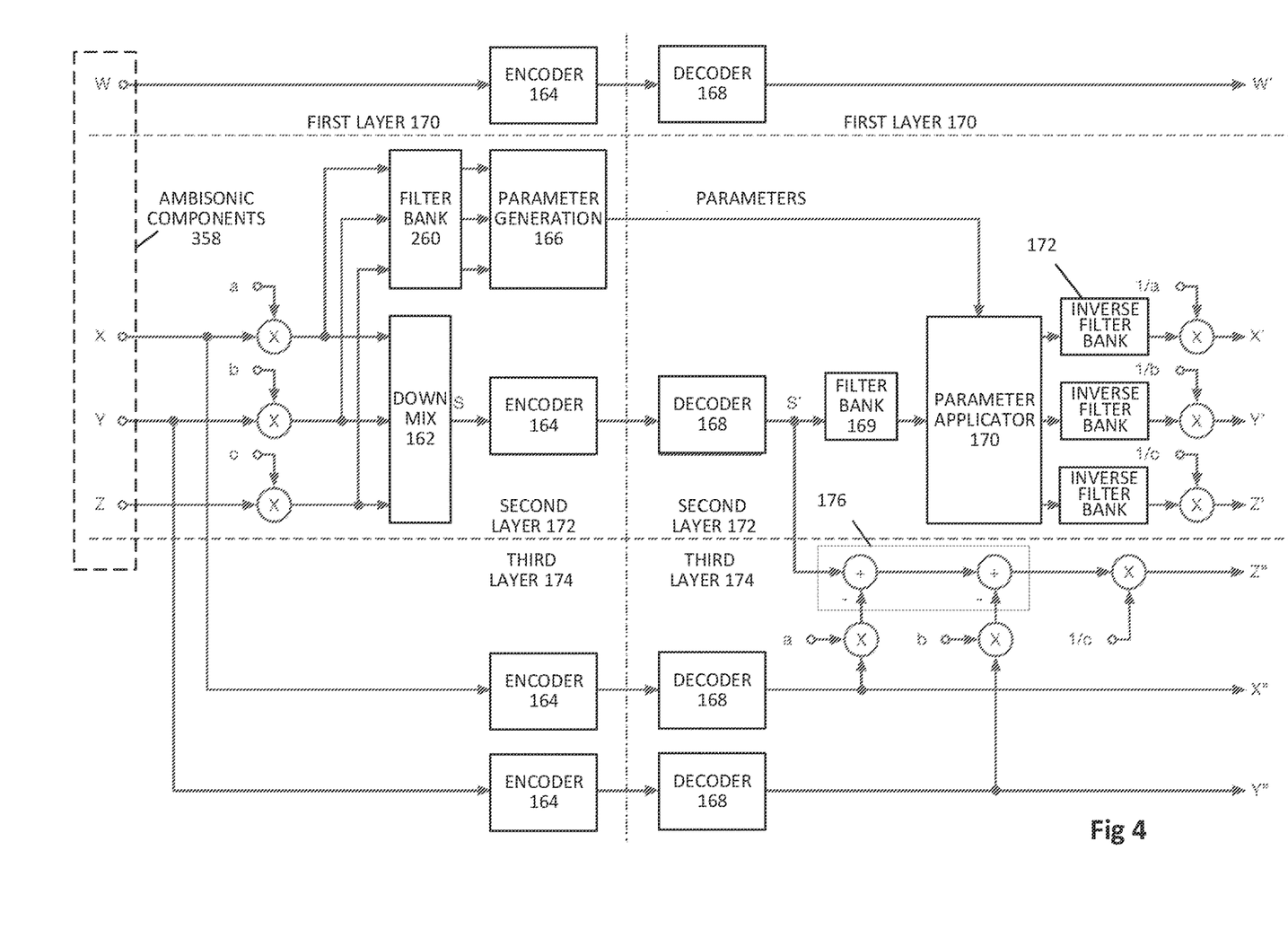
FIG. 4 shows a process and system for encoding layered audio with parametric coding and Ambisonics, according to one aspect.

In one aspect, base layer 126 includes selectable sublayers 101, 102, and 103. This can allow for further customization and utilization of bandwidth by a downstream device, as shown in FIG. 4 and described in other sections.

Figure 2:
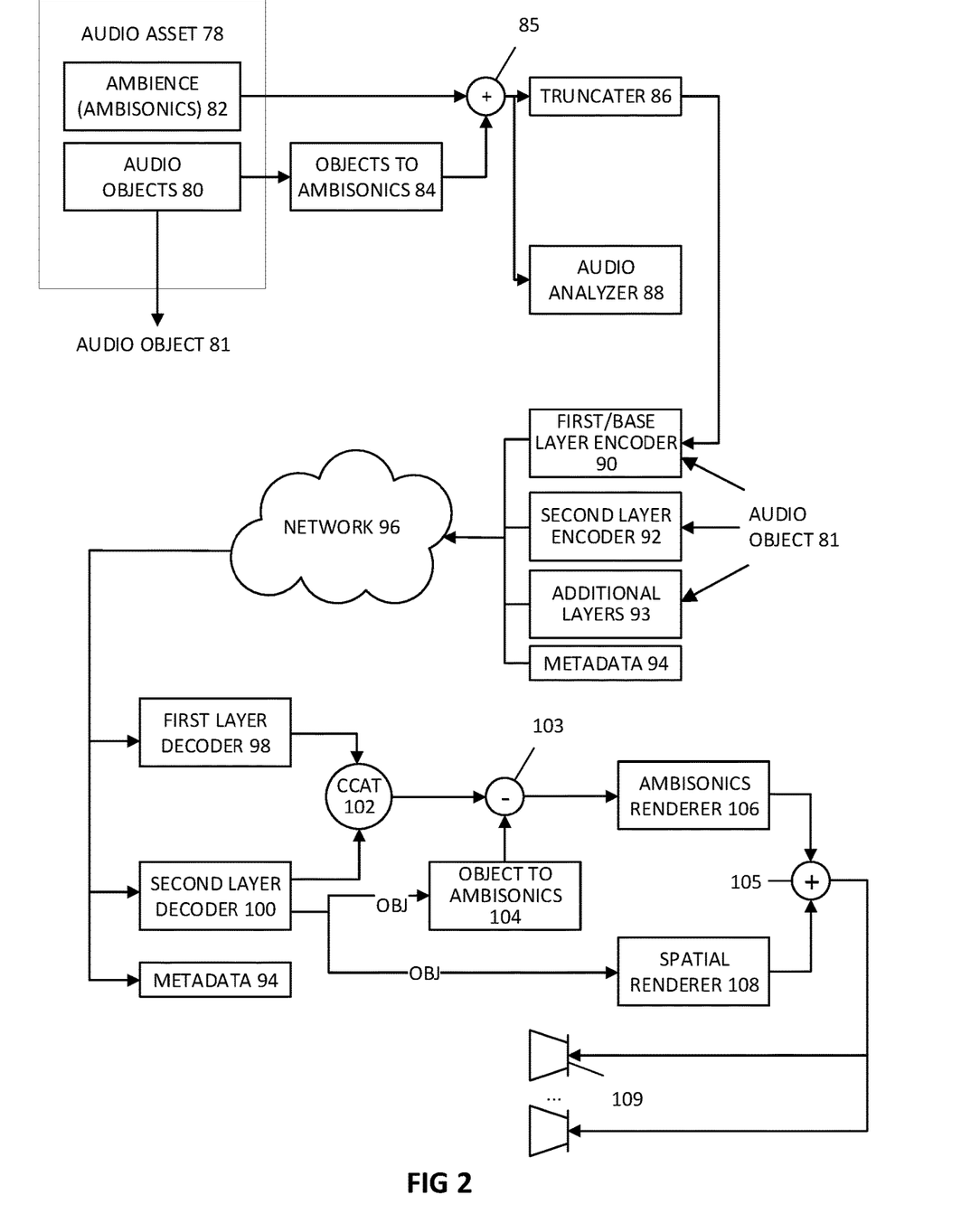
FIG. 2 shows a process and system for encoding layered audio with Ambisonics and object-based audio, according to one aspect.

FIG. 2 shows an audio encoding and decoding process and system according to one aspect. An audio asset 78 can include Ambisonic components 82 that represent ambience sound and one or more audio objects 80. The ambience and audio objects can be combined to form a first or base layer of audio. For example, all of the audio objects, or a select subset of audio objects, can be converted at block 84 to Ambisonics components. In one aspect, if there are N ambience Ambisonic components, then the audio objects 80 can be converted, at block 84, into N Ambisonic components that contain sounds from the audio objects at their respective virtual locations. In another aspect, at block 84, the audio objects are converted into a single Ambisonic component, e.g., the omni-directional W component.

Audio objects can be converted to Ambisonic format by applying spherical harmonic functions and direction of each object to an audio signal of the object. Spherical harmonic functions $Y_{mn}(\theta,\varphi)$ define Ambisonics encoding functions where $\theta$ represents azimuth angle and $\varphi$ represents elevation angle of a location in spherical coordinates.

A sound source S(t) can be converted to an Ambisonic component by applying $Y_{mn}(\theta_s,\varphi_s)$ to S(t), where $\theta_s$ and $\varphi_s$ describe the direction (azimuth and elevation angle) of the sound source relative to the center of the sphere (which can represent a recording and/or listener location). For example, Ambisonics components for a given sound source S(t) can be calculated for lower order Ambisonics components as follows:

$$W=B_{00}=SY_{00}(\theta_s,\phi_s)=S$$

$$X=B_{11}=SY_{11}(\theta_s,\phi_s)=S\sqrt{3}\cos\theta_s\cos\phi_s$$

$$Y=B_{1-1}=SY_{1-1}(\theta_s,\phi_s)=S\sqrt{3}\sin\theta_s\cos\phi_s$$

$$Z=B_{10}=SY_{10}(\theta_s,\phi_s)=S\sqrt{3}\sin\phi_s$$

Other Ambisonic components (e.g., in higher orders) can be determined similarly, but with other known spherical harmonic functions $Y_{mn}$. In such a manner, block 84 generates Ambisonic components with sounds from the audio objects 80. These Ambisonic components are combined at block 85 with the ambience Ambisonics 82. The combined ambience and object-based Ambisonic audio components can be truncated at block 86 to remove Ambisonic audio components of an order greater than a threshold (e.g., beyond a first order, or beyond a second order).

For example, if the base layer is to only contain first order Ambisonics, and the combined Ambisonic components contain up to 8 orders of Ambisonic components, then any Ambisonic component that is greater than $B_{10}$ can be removed at block 86. The remaining Ambisonic audio components (e.g., W, X, Y, and Z) are the first set of Ambisonic audio components (having ambience and the object-based audio information) that are encoded in the first layer of the bit stream at block 90.

At least one of the audio objects 80 (e.g., audio object 81) can be encoded into a second layer at encoder 92. As mentioned, additional Ambisonic components that contain ambience (such as one or more of the components that were removed from the Ambisonic components prior to encoding the first layer) can also be encoded in the second layer. Similarly, additional layers 93 can contain additional Ambisonic components (e.g., in ascending order) as well as additional audio objects. It should be understood that while the base layer includes the sounds in the audio objects and the ambience combined into Ambisonic components (with some optional objects sent discretely and not mixed into Ambisonic components), but in the enhancement layers (the second and additional layers) the audio objects are encoded discretely, separate from the Ambisonic components (if also included in the same respective enhancement layer).

Metadata 94 describes how the different information (audio objects and Ambisonic components) are bundled into different layers, allowing for a downstream device to select (e.g., through a request to the server with live or offline encoded bitstreams) which enhancement layers the downstream device wishes to receive. As mentioned, this selection can be based on different factors, e.g., a bandwidth of the network 96, listener position/preference and/or capabilities of the downstream device. Listener position can indicate which way a listener is facing or focusing on. Listener preferences can be stored in based on user settings, device settings, and/or adjusted through a user interface. A preference can indicate a preferred position of the listener, for example, in a listener environment.

A decoding device can receive the first (base) layer and, if selected, additional layers (e.g., the second layer). The downstream device can decode, at block 98, the first layer having the first set of Ambisonic components that were generated by the encoder based on ambience 82 and object-based audio 80. At block 100, the second layer having at least one of the object-based audio signals (e.g., audio object 81) is decoded. If the second layer also has additional Ambisonic audio components (e.g., a second set of Ambisonic audio components), then these components can be concatenated to the first set that were decoded from the first layer at block 102. It should be understood that each layer contains unique non-repeating Ambisonic audio components. In other words, an Ambisonic component corresponding to a particular set of Ambisonic coefficients (e.g., $B_{10}$) will not be repeated in any of the layers. Thus, each Ambisonic component builds on another and they can be concatenated with relative ease.

At block 103, the object-based audio extracted from the second layer is subtracted from the received Ambisonic audio components. The received Ambisonic audio components can include the first set of Ambisonic audio components received in the first layer, and any additional Ambisonic audio components received in the other layers). Prior to subtraction, the object-based audio can be converted to Ambisonic format at block 104, and the converted audio is then subtracted from the received Ambisonic audio components. This resulting set of Ambisonic audio components are rendered by an Ambisonic renderer at block 106, into a first set of playback channels. By subtracting the object-based from the Ambisonic audio components at block 103, this prevents audio artifacts that might be noticeable if the same sound source is rendered by the spatial renderer and also by the Ambisonics renderer.

The object-based audio received from the second layer is rendered spatially at block 108, e.g., by applying transfer functions or impulse responses to each object based audio signal, to generate a second set of playback channels. At block 105, the first set of playback channels and second set of playback channels are combined into a plurality of speaker channels that are used to drive a plurality of speakers 109. Speakers 109 can be integrated into cabinet loudspeakers, one or more speaker arrays, and/or head worn speakers (e.g., in-ear, on-ear, or extra-aural).

It should be understood that although blocks are shown in the encoding and decoding of only the second layer, additional layers can be encoded and decoded in the same manner, having additional object-based audio and additional Ambisonic audio components. For example, the decoding device can communicate a request to the encoding device/server to include a third layer of data in the bit stream. The encoder can then encode the third layer with additional audio objects and/or Ambisonic audio components, different from those already included in the second layer and first layer.

Figure 3:
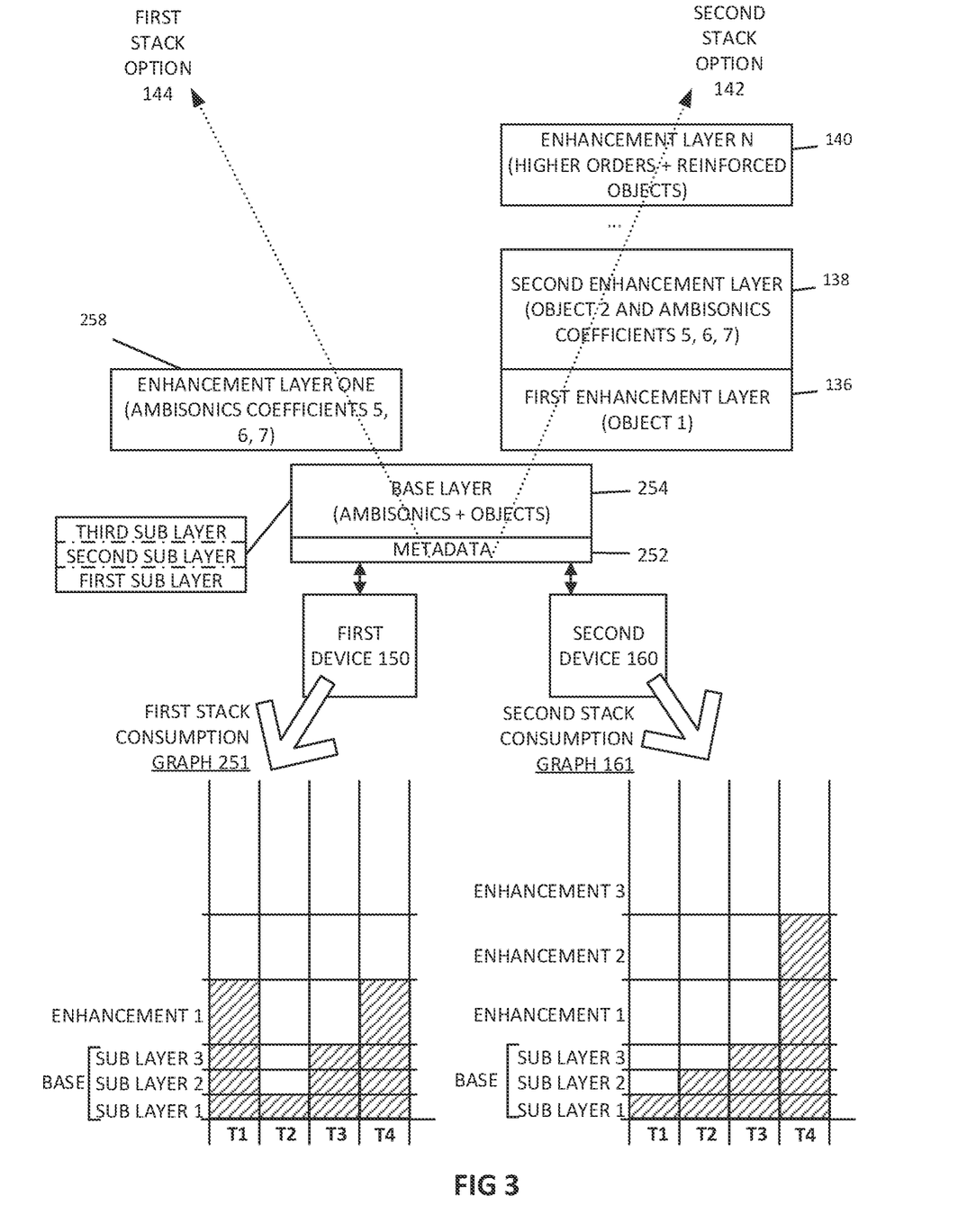
FIG. 3 shows a process and system for encoding layered audio with Ambisonics and object-based audio with multiple layered stack options, according to one aspect.

FIG. 3 illustrates aspects of the present disclosure with one or more different layer stacks, each having different layered audio information. For example, a first stack option 144 and second stack option 142 can be supported by an encoder, configuration data for each enhancement layer can be included in metadata 252. These stack options share base layer 254. The first stack option can have a first enhancement layer 258 that contains additional Ambisonics coefficients 5, 6, and 7. The second stack option can include different enhancement layers than those in the first stack option. For example, a first enhancement layer 136 includes a first object-based signal; a second enhancement layer 138 includes an object 2 and Ambisonics coefficients 5, 6, 7; and additional enhancement layers 140 contain higher orders of Ambisonics coefficients and additional audio objects. In one aspect, each additional layer (or enhancement layer) can build on the previous layer, having a same or higher order of Ambisonic components than the previous layer.

In one aspect, some Ambisonic components are removed if they are deemed to not contain useful information. For example, Ambisonic audio components corresponding to Ambisonics coefficients 8 and 9 can be removed by the encoder, if the encoder detects that these components contain little to no audio information. This can further utilize available bandwidth by preventing the encoding and transmission of useless audio signals.

A first device 150 (e.g., a decoder and/or playback device) can examine metadata 252 to determine which stack option is most suitable to be received. Seeing that stack option 2 contains object-based audio signals, the first device can select the first stack option if it does not have computational or near-field capabilities to render the object-based audio. This can prevent wasted bandwidth and encoder-side computation which would otherwise be spent encoding audio information of the second stack option and then transmitting over a communication protocol.

Similarly, a second device 160 might choose to select the second stack option based on audio capabilities of the second device. The second device can select which of the layers in the second stack option is to be received based on available bandwidth. For example, if the second device has a bandwidth below 128 kBPS, then the second device can request only the base layer be sent. At a later time, if bandwidth increases, then the second device can request enhancement layers. To further illustrate this, a graph 161 shows layer consumption of the second device at different time intervals T1-T4. At T1, bandwidth might be especially low, so the device requests that only the first sublayer of the base layer be sent. As bandwidth gradually increases (e.g., the device's communication connection grows stronger), then additional sublayers and enhancement layers are requested and received at T2, T3, and T4.

Similarly, a graph 251 can show layer consumption of the first device 150. Here, the device might have a high bandwidth at time T1, but then a low bandwidth at T2. At T1, the device can request and consume all of the base layer and enhancement layer 1. At T2, the device requests that only the first sublayer of the first layer be sent. The bandwidth, however, can increase at times T3 and T4, Thus, the first device can request and consume additional sublayers 2 and 3 at time T3 and enhancement layer 1 at time T4. A receiving device can select different layers and sublayers at different times, from one audio frame to another audio frame.

As described, the decoder (a downstream device) can select (e.g., by communicating a request to the encoder) any of the enhancement layers based various factors, for example, bandwidth, computing capabilities, or near-field playback capabilities. Additionally or alternatively, the decoder can select enhancement layers based on spatial rendering capabilities. For example, a playback device might have capability to render sound horizontally but not have capability to render sound vertically at varying heights. Similarly, a playback device may not have capability to render certain surround information. For example, if a playback device is limited to specific rendering format (5.1 surround sound, 7.2 surround sound, etc.).

FIG. 4 shows an encoding and decoding process and system that uses parametric coding, according one aspect of the present disclosure. As discussed, low-bitrate applications of spatial audio coding, the available bandwidth (e.g. bitrate) of a given data channel may vary during playback. When the bandwidth drops, various tradeoffs can be made to optimize the user experience in terms of audio quality degradation. When listening to immersive audio at higher bitrates, the user experience could suffer when the codec can only deliver stereo or mono audio when the bitrate drops below a certain threshold.

In one aspect, a layered audio process and system includes a parametric approach that can maintain immersive audio for first order Ambisonics (FOA) components at significantly lower bitrates compared to non-parametric audio coding methods. Such a system can maintain the spatial audio scene with lower precision instead.

The encoder can encode a first layer 170, a second layer 172, and a third layer 174. In one aspect, these layers correspond, respectively, to the first sub layer, second sub layer, and third sub layer of the base layer described in other sections and shown in FIGS. 1-3. The first layer can be encoded to contain the omni-directional FOA component W. The second layer can be encoded to using parametric coding include a summation signal of X, Y, and Z. The resulting FOA signal can be rendered for any speaker layout. A third layer can be encoded to include two of the three components X, Y, and Z without parametric coding. The third component that is not included in the third layer can be derived by the decoder based on subtracting the two components from the summation of the second layer.

Ambisonic components 358 can include first order Ambisonics W, X, Y and Z. In one aspect, W, X, Y and Z each contain sounds from converted object-based audio signals as well as ambience, as shown in FIG. 2 and described in other sections. In one aspect, the blocks shown performed on the encoder side of FIG. 4 can correspond to block 90 of FIG. 2 and the blocks shown performed on the decoder side of FIG. 4 can correspond to block 98 of FIG. 2. In another aspect, the encoder and decoder blocks shown in FIG. 4 can be performed independent of other enhancement layers and does not require other aspects described in FIGS. 1-3.

The first layer 170 has contains only Ambisonic component W having an omni-directional polar pattern. An encoder block 164 can encode W using known audio codecs. W can be played back as a mono signal.

In the second layer 172, three Ambisonic audio components are combined at block 162, the components including a) a first bi-directional polar pattern audio component aligned in a first direction (e.g., front-back or 'X'), b) a second bi-directional polar pattern audio component aligned in a second direction (e.g., left-right or 'Y'), and c) a third bi-directional polar pattern audio component aligned in a third direction (e.g., up-down or 'Z'), resulting in a combined or downmixed channel S. The combined channel S is encoded at block 164.

A filter bank 260 can be used to filter each component to extract sub-bands of each component. The parameter generation block 166 can generate parameters for each of the sub-bands of each component. In one aspect, filter bank 260 can use critical band filters to extract only the sub-bands that are audible (e.g., using critical band filters). Parameters can define correlation between the three Ambisonic audio components, level differences between the three Ambisonic audio components, and/or phase differences between the three Ambisonic audio components. Other control parameters can be generated to improve spatial reproduction quality. The parameters can be associated for different time frames. For example, for a uniform time resolution, each time frame can have a constant duration of 20 MS.

In the third layer 174, encoder blocks 164 encode only two of the three Ambisonic components (for example, X and Y, Y and Z, or X and Z) that are in the summed channel. At the decoder side, the remaining Ambisonic component (not included in the third layer) can be derived based on a) the summed channel (received in the second layer) and b) the two Ambisonic components (received in the third layer).

In one aspect, optional weighting coefficients a, b, and c can be applied to each of the three Ambisonic audio components X, Y and Z to optimize the downmix of the three components into the S signal. The application of the coefficients can improve alignment in level and/or reduce signal cancelation. In one aspect, the weighting coefficients can be applied in the sub-band domain.

A decoder can select how many of the layers to consume, based on bandwidth. With only the first layer, a listener can still hear ambience and sound sources of a sound scene, although spatial resolution is minimal. As bandwidth increases, the decoder can additionally request and receive the second layer 172 and then the third layer 174.

A decoder can decode the summed channel and Ambisonic components at blocks 168, which can ultimately be rendered by an Ambisonic renderer to generate channels that can be used to drive speakers (e.g., an array of loudspeakers or a headphone set). For example, the first layer of the received bit stream can be decoded at block 168 to extract Ambisonic component W'. At second layer 172, the summed signal S' can be extracted at block 168 and a parameter applicator 170 can apply the one or more parameters (generated at block 166) to S' to generate Ambisonic audio components X', Y', and Z'. These Ambisonic audio components can be compressed versions of X, Y, and Z. The trade-off, however, is that transmitting the summed channel and the parameters requires less bandwidth than transmitting X, Y, and Z. Thus, the summed signal S of the second layer provides a compressed version of X, Y, and Z.

In the third layer, two of the three summed components (for example, X and Y, Y and Z, or X and Z) can be decoded at block 168. The decoder can, at block 176, subtract these two components from the summed channel. In such a case where the decoder has received the third layer, the decoder can simply ignore the parameters and skip the parameter application block 170, to reduce processing overhead. Rather, the decoder need only decode the two received components, and then extract the third Ambisonic component from the summed channel through subtraction.

In one aspect, encoders and decoders described in the present disclosure can implement existing and known codecs for encoding and decoding audio signals. In one aspect, the third layer can jointly encode the two components (X and Y) with a single codec that can take advantage of correlation between the two components. It should be understood that, although shown as X and Y, layer three can contain X and Z, or Y and Z. For example, if Y and Z are encoded and transmitted in the third layer, then X can be derived from the summed signal S'. Quantization errors may add during the recovery of X from S', the recovered X signal may have more distortions than the Y and Z components. Therefore, some implementations may prefer to recover the Z component from S' instead. Z is typically associated with sound sources above or below the listener where spatial perception is less accurate than in the horizontal plane. The Z component might also carry less energy on average as most audio sources are typically placed in the horizontal plane, for example consistent with the video scene.

In one aspect, the parameter applicator block 170 applies the parameters to the summed signal S' in the sub-band domain. A filter bank 169 can be used convert S' into sub-bands from S'. After the parameters are applied, inverse blocks 172 can be used to convert those sub-bands back to full-bands. Further, if weighting coefficients are applied at the encoder, inverse coefficients can be applied at the decoder as shown, to reconstruct the Ambisonic components X, Y and Z.

The layered structure shown in FIG. 4 can beneficially reduce bitrate when needed, but still allow for improved spatial quality when greater bandwidth is present. For example, a decoder can receive only the first layer 170 and play back the W signal in mono if bitrate reduction is critical. Alternatively, the decoder also can receive the second layer, in which case the decoder can reuse the W signal received in the first layer and reconstruct X', Y', and Z' based on a summed signal S'. Bit rate in this case, is still improved in comparison to transmitting X, Y, and Z, because the data footprint for S' and the parameters are significantly less than the bit rate required for X, Y, and Z, the footprint of the parameters being negligible. Alternatively, the decoder can receive all three layers 170, 172, and 174, in which case, only two of the components need be sent in the third layer, the third component being reconstructed as discussed above.

Figure 5:
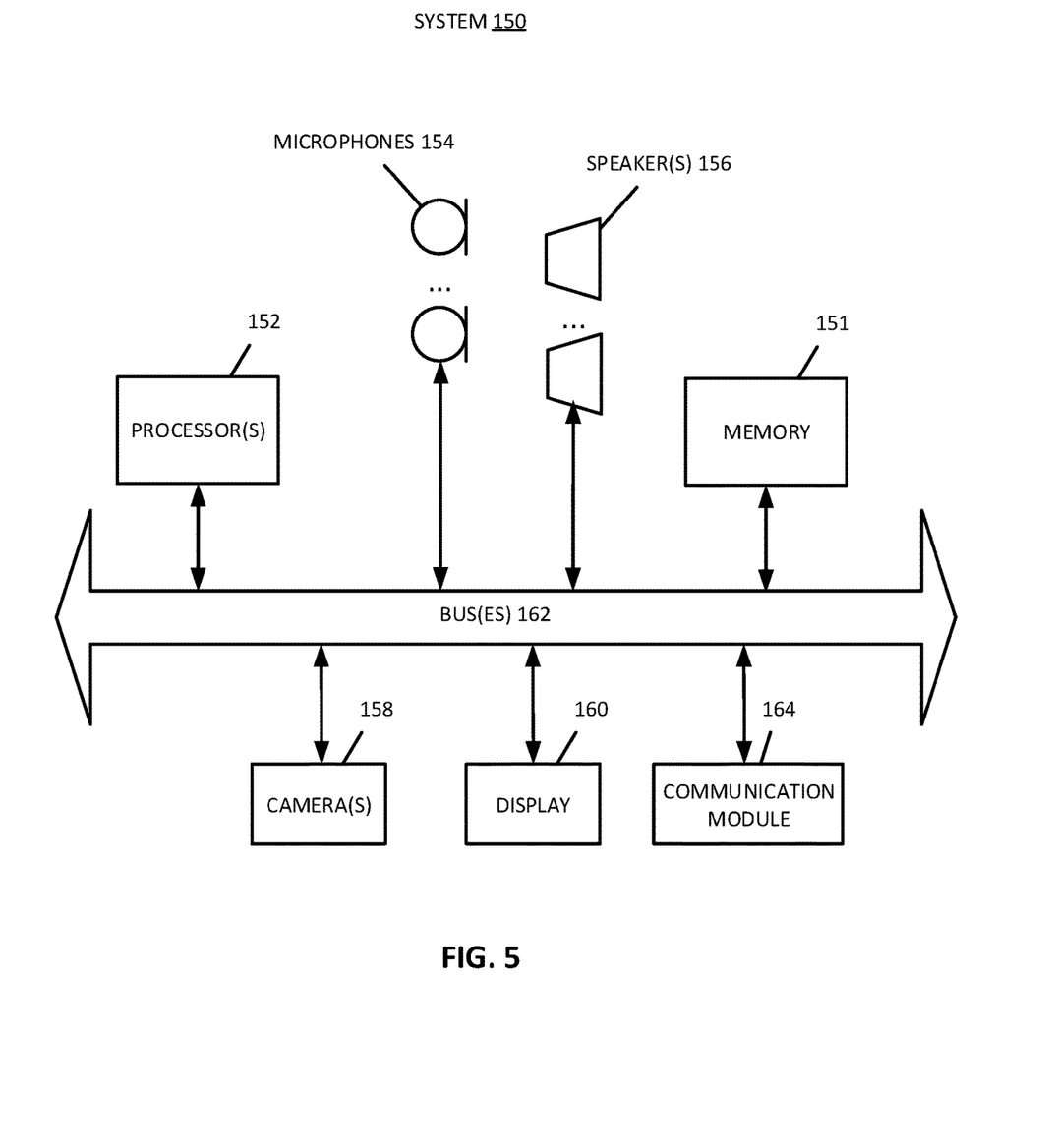
FIG. 5 illustrates an example of audio system hardware, according to one aspect.

FIG. 5 shows a block diagram of audio processing system hardware, in one aspect, which may be used with any of the aspects described herein (e.g., headphone set, mobile device, media player, or television). This audio processing system can represent a general purpose computer system or a special purpose computer system. Note that while FIG. 5 illustrates the various components of an audio processing system that may be incorporated into headphones, speaker systems, microphone arrays and entertainment systems, it is merely one example of a particular implementation and is merely to illustrate the types of components that may be present in the audio processing system. FIG. 5 is not intended to represent any particular architecture or manner of interconnecting the components as such details are not germane to the aspects herein. It will also be appreciated that other types of audio processing systems that have fewer components than shown or more components than shown in FIG. 7 can also be used. Accordingly, the processes described herein are not limited to use with the hardware and software of FIG. 5.

As shown in FIG. 5, the audio processing system 150 (for example, a laptop computer, a desktop computer, a mobile phone, a smart phone, a tablet computer, a smart speaker, a head mounted display (HMD), a headphone set, or an infotainment system for an automobile or other vehicle) includes one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art. Camera 158 and display 160 can be coupled to the bus.

Memory 151 can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "analyzer", "separator", "renderer", "encoder", "decoder", "truncator", "estimator", "combiner", "synthesizer", "controller", "localizer", "spatializer", "component," "unit," "module," "logic", "extractor", "subtractor", "generator", "applicator", "optimizer", "processor", "mixer", "detector", "calculator", and "simulator" are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are notlimited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method for decoding layered audio, comprising:
   decoding from a bit stream generated by an upstream device, a first layer of data having a first set of Ambisonic audio components, the first set of Ambisonic audio components generated based on ambience and one or more object-based audio signals;
   decoding from the bit stream, a second layer of data having at least one of the one or more object-based audio signals;
   converting the at least one of the one or more object-based audio signals to an Ambisonic audio format;
   subtracting, from the first set of Ambisonic audio components, the converted at least one of the one or more object-based audio signals, and rendering resulting first set of Ambisonic audio components to generate a first set of audio channels;
   spatially rendering the one or more object-based audio signals to generate a second set of audio channels; and
   combining the first set of audio channels and the second set of audio channels, the combined audio channels used to drive a plurality of speakers of a playback device.

2. The method of claim 1, further comprising communicating a request to the upstream device, to include the second layer of data in the bit stream, based on bandwidth.

3. The method of claim 1, wherein the second layer of data includes a second set of Ambisonic audio components, not mixed with the at least one of the one or more object-based audio signals of the second layer, and the method further comprises concatenating the second set of Ambisonic audio components to the first set of Ambisonic audio components.

4. The method of claim 1, further comprising
   communicating a request to the upstream device, to include a third layer of data in the bit stream, based on bandwidth; and
   decoding the third layer of data received in the bit stream, the third layer including at least another of the one or more object-based audio signals or a third set of Ambisonic audio components.

5. The method of claim 1, further comprising communicating a request to the upstream device, to include the second layer of data in the bit stream, or an additional enhancement layer, based on device capability of the playback device.

6. The method of claim 5, wherein the device capability includes one or more of the following: a near-field playback capability, a computational ability, an acoustic playback capability, an ability to render sound at height range, or an ability to render sound in a surround format.

7. The method of claim 1, further comprising communicating a request to the upstream device, to include the second layer of data in the bit stream, or an additional enhancement layer, based on viewing position of a listener, a direction that the listener is facing, or a direction that the listener has indicated.

8. The method of claim 1, further comprising communicating a request to the upstream device, to include the second layer of data in the bit stream, or an additional enhancement layer, based on preferred position.

9. The method of claim 1, wherein the first layer of data includes one of the one or more object-based audio signals not mixed with the first set of Ambisonic audio components.

10. An audio system, comprising:
a processor;
a plurality of speakers; and
non-transitory computer-readable memory having stored therein instructions that when executed by the processor cause the processor to perform operations including:
decoding from a bit stream generated by an upstream device, a first layer of data having a first set of Ambisonic audio components, the first set of Ambisonic audio components generated based on ambience and one or more object-based audio signals;
decoding from the bit stream, a second layer of data having at least one of the one or more object-based audio signals;
converting the at least one of the one or more object-based audio signals to an Ambisonic audio format;
subtracting, from the first set of Ambisonic audio components, the converted at least one of the one or more object-based audio signals, and rendering resulting first set of Ambisonic audio components to generate a first set of audio channels;
spatially rendering the one or more object-based audio signals to generate a second set of audio channels; and
combining the first set of audio channels and the second set of audio channels, the combined audio channels used to drive the plurality of speakers.

11. The audio system of claim 10, further comprising communicating a request to the upstream device, to include the second layer of data in the bit stream, based on bandwidth.

12. The audio system of claim 11, wherein the second layer of data includes a second set of Ambisonic audio components, and the operations further comprises concatenating the second set of Ambisonic audio components to the first set of Ambisonic audio components.

13. The audio system of claim 10, further comprising
communicating a request to the upstream device, to include a third layer of data in the bit stream, based on bandwidth; and
decoding the third layer of data received in the bit stream, the third layer including at least another of the one or more object-based audio signals or a third set of Ambisonic audio components.

14. The audio system of claim 10, further comprising communicating a request to the upstream device, to include the second layer of data in the bit stream, or an additional enhancement layer, based on device capability of the audio system.

15. The audio system of claim 14, wherein the device capability includes one or more of the following: a near-field playback capability, a computational ability, an acoustic playback capability, an ability to render sound at height range, or an ability to render sound in a surround format.

16. The audio system of claim 10, further comprising communicating a request to the upstream device, to include the second layer of data in the bit stream, or an additional enhancement layer, based on viewing position of a listener, a direction that the listener is facing, or a direction that the listener has indicated.

17. The audio system of claim 10, further comprising communicating a request to the upstream device, to include the second layer of data in the bit stream, or an additional enhancement layer, based on preferred position.

18. The audio system of claim 10, wherein the first layer of data includes one of the one or more object-based audio signals not mixed with the first set of Ambisonic audio components.

19. A processor, configured to execute instructions stored on non-transitory computer-readable memory that cause the processor to perform operations including:
decoding from a bit stream generated by an upstream device, a first layer of data having a first set of Ambisonic audio components, the first set of Ambisonic audio components generated based on ambience and one or more object-based audio signals;
decoding from the bit stream, a second layer of data having at least one of the one or more object-based audio signals;
converting the at least one of the one or more object-based audio signals to an Ambisonic audio format;
subtracting, from the first set of Ambisonic audio components, the converted at least one of the one or more object-based audio signals, and rendering resulting first set of Ambisonic audio components to generate a first set of audio channels;
spatially rendering the one or more object-based audio signals to generate a second set of audio channels; and
combining the first set of audio channels and the second set of audio channels, the combined audio channels used to drive the plurality of speakers.

* * * * *